UNITED STATES PATENT OFFICE.

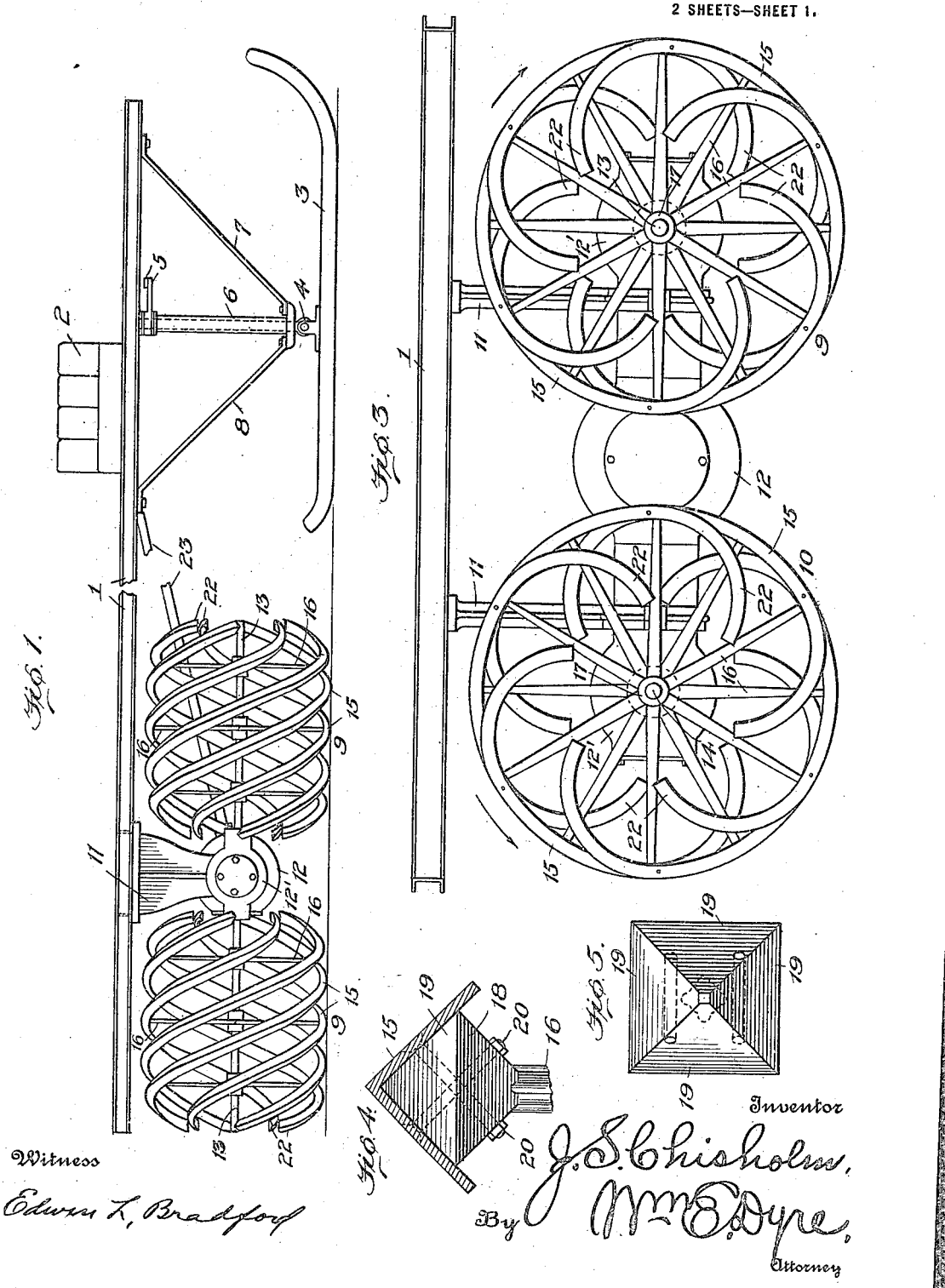

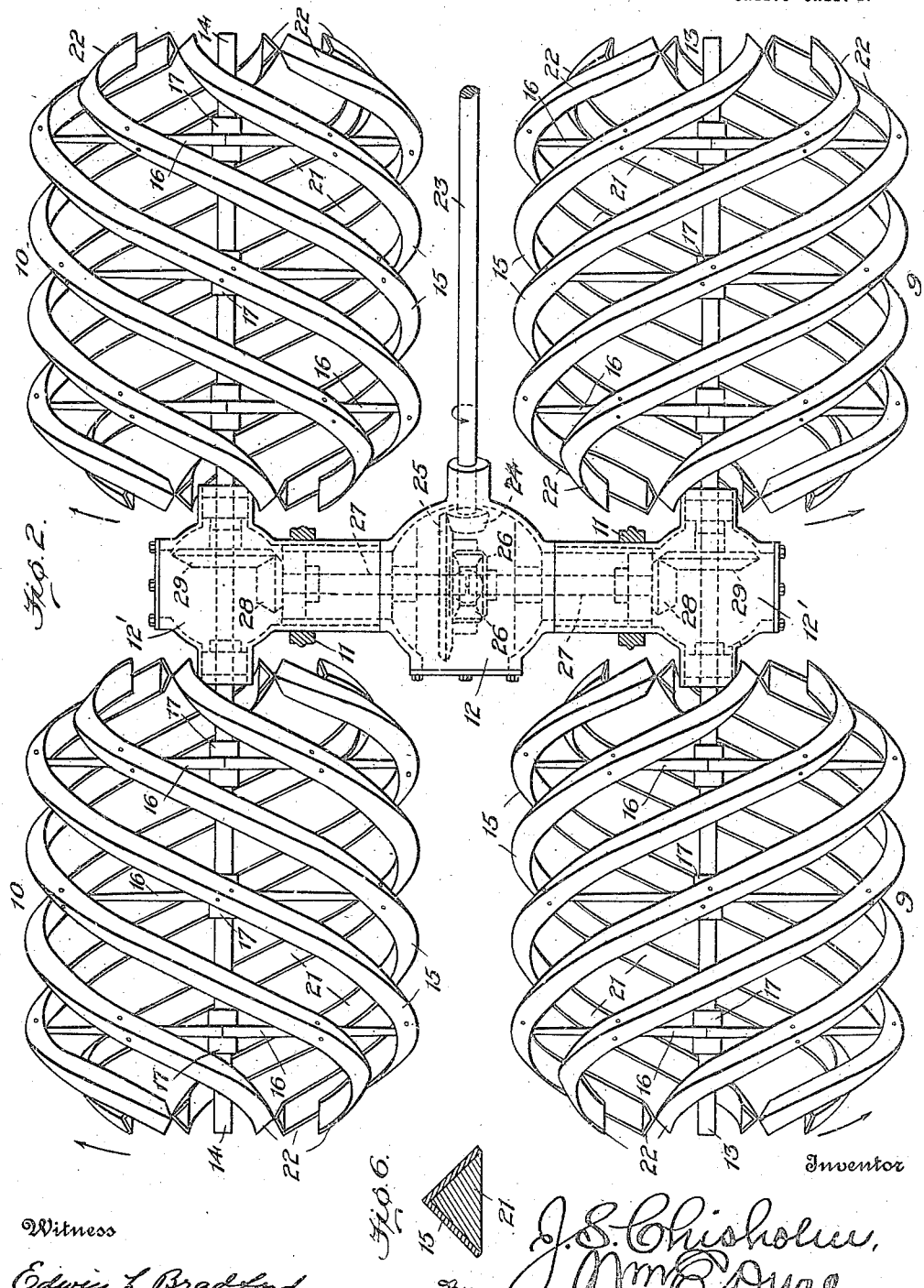

JOHN S. CHISHOLM, OF DETROIT, MICHIGAN.

MOTOR-SLEIGH.

1,254,479.

Specification of Letters Patent. Patented Jan. 22, 1918.

Application filed May 5, 1916. Serial No. 95,637.

*To all whom it may concern:*

Be it known that I, JOHN S. CHISHOLM, a citizen of the United States, residing at Detroit, in the county of Wayne and State of Michigan, have invented certain new and useful Improvements in Motor-Sleighs; and I do hereby declare the following to be a full, clear, and exact description of the invention, such as will enable others skilled in the art to which it appertains to make and use the same.

This invention contemplates certain new and useful improvements in motor or power driven sleighs, and relates more especially to that class wherein the propelling and tractive means constitute the main support and load carrying elements of the sleigh.

An object of the present invention is to provide a power driven sleigh, including a novel arrangement of helically disposed runners as the tractive transmission means, whereby the greatest possible load carrying and propelling efficiency is obtained.

Another object of the invention is the production of a motor sleigh in which the tractive transmission means comprises a plurality of helical runners or shoes which are of substantially V shape in cross section, and are adapted to both support and propel the vehicle.

Another object of the present invention is to produce a power-driven sleigh including in combination a series of helical cage-like or skeleton runners arranged and adapted to be driven in pairs, and designed in the matter of pitch according to predetermined calculations dependent upon the varying load and snow conditions under which the sleigh is intended for use.

A further object of the present invention is the production of motor sleighs mounted upon helical runners, which because of the peculiar arrangement and form of their contacting surfaces obtain a maximum tractive hold or grip upon the snow thus insuring the highest possible degree of propelling efficiency, and at the same time insuring a minimum amount of resistance to their rotary slipping movement as the vehicle advances.

A further object is the production of light and exceedingly strong cage-like helical supporting and driving runners, arranged in oppositely disposed pairs, capable of being driven in reverse directions by suitable power transmission mechanism, about which the said drives, as a cluster, are free to move in a vertical plane parallel with the line of movement of the sleigh, the better to adapt themselves to surface and road irregularities.

With the foregoing and other objects and advantages in view, the invention further resides in the general combination and structural arrangement of correlative parts, all of which will be hereinafter particularly described and pointed out by the appended claims.

In the accompanying drawings which illustrate one embodiment of the present invention, and whereupon corresponding numerals refer to like parts in the several views:

Figure 1 is a side elevation of the invention, showing a tandem pair of helical supporting and propelling runners, an intermediate gear casing dependent from a sleigh floor, movable front steering runners, and a motor diagrammatically shown.

Fig. 2 is a relatively enlarged plan view of both sets of helically formed supporting and propelling runners, showing also their respective driving shafts, a gear casing, a main power shaft, and by dotted lines the interconnected transmission gears for rotating said helical runners.

Fig. 3 is a rear end view showing means for supporting the vehicle frame, and also the inwardly curved ends of the helical runners.

Fig. 4 is a detail sectional view through one V-shaped helical runner, showing in full lines one end of one supporting spoke or spider-arm having an enlarged head to which said runners are securely bolted, as shown.

Fig. 5 is a top plan view of one of the supporting heads shown by Fig. 4, and

Fig. 6 is a detail cross sectional view through another portion of one helical runner, illustrating a filler block or reinforcing strip embedded therein.

Reference being had to the drawings and numerals thereon, the present invention will be seen to comprise among other things, a supporting frame upon which may be mounted any desired form of sleigh or truck body; a double series of helical runners interconnected with the body frame adapted to support and propel the vehicle as will hereinafter more fully appear, forward runners comprising straight skees or shoes having upturned ends and pivotally mounted for steering purposes, and finally a motor of any approved construction carried by the vehicle frame.

It is well understood by persons familiar with the art to which my invention relates that the several types of motor sleighs heretofore devised are quite limited in their range of usefulness, and in the conditions under which they may be operated with more or less satisfaction. Experience has shown that they have been most efficient in heavy, wet and comparatively shallow bodies of snow, and quite inefficient when the snow is deep, dry, mealy or flaky. Heretofore the load has invariably been shifted to smooth runners longitudinally arranged, or to cylinders similarly arranged, and when helical propellers have been employed in conjunction with such supporting means, they have been used for tractive purposes only. In other words, the weight of the load, and the propelling force have not heretofore been applied through the same identical surfaces on the snow. While on the contrary the present invention employs this as its basic principle of operation, every pound of load being supported by the driving or propelling shoes, and every inch of said shoes in contact with the snow being at one and the same time both a propelling and supporting surface.

Practical experience with the present construction has demonstrated its utility and efficiency. In soft snows the helical shoes or runners naturally sink until the reaction bears up the load, when, the tractive force as applied to the runners, being a negligible quantity in comparison with the load, does not bear back or dig into the surface of the snow, but on the contrary causes the said helical runners to slip smoothly in transverse grooves formed by their V surfaces thus applying power upon the principle of a screw. That is to say, the load and pull are applied at identical points, and coöperate in securing an effective tractive footing, the helical arrangement of runners, and their substantially V-shape cross sectional form, serving to apply the tractive force without in the least relieving them of their load carrying functions. It is an undoubted fact that a straight shoe or runner impinging directly upon the snow, whether in a horse-drawn or power-driven vehicle of types heretofore known, must first pack the snow uniformly to an appreciable depth in order to produce a dependable tractive surface, whereas with rotary helical load supporting and propelling shoes or runners having V threads such as employed in the present invention, there is effected a constant packing of what may be comparatively termed a skin surface of snow, upon which the upbearing helical runners are constantly disposed to climb while slipping through the V grooves which are cut as they advance.

It is a well known fact that horse-drawn sleighs were originally equipped with flat runners, and that same were attended by a constant tendency toward side slipping upon slanting or uneven surfaces, or from the snow covered crowns of road beds. It is also understood that these flat runners were superseded by half round runners, which in a measure cured the defects aforesaid by cutting their way in the snow and producing shallow channels within which to travel. The said half round runners are the horse-drawn equivalent of the present self-propelled V-shaped runners, in so far as a retrograde or cutting back action of the runners themselves is concerned. In the one side slipping is discouraged as the sleigh advances, in the other cutting or tearing back of the individual V runner is prevented as they are caused to slip spirally through V grooves of their own formation while the sleigh advances. In the one there is no bearing up tendency from the level of the impacted snow at a depth sufficient to sustain the entire weight of the vehicle and load, in the other this uplifting action is amply provided for as aforesaid, while at the same time this "hunting action" of the V runners serves admirably to keep them clear of snow, when operating at comparatively low temperatures. The added transverse motion not only removes the snow from runners by mechanical means, but helps to work the frost out of them which would otherwise cause the snow to cling.

Reference being had to the drawings which form part of this application for Letters Patent, and to the numerals thereon, it will be seen that the present invention comprises a main vehicle frame 1, upon which is mounted a suitable engine or storage battery diagrammatically indicated at 2. The front supporting and steering shoes or runners 3 may be of any well known material or form of construction, and are intermediately pivoted at 4 the better to conform to inequalities of the snow or road conditions. The means for steering said runners 3 may be of any well known construction operated by suitable connections such as a steering wheel (not shown), coöperating with interconnected turning levers 5 and vertical steering posts within a hollow supporting column 6 at each side of the frame 1. Braces 7 and 8 are provided upon each side of these columns 6 and there rigidly secured at their lower ends, their upper ends being in like manner secured to the under side of main frame 1 as shown by Fig. 1.

No particular novelty is claimed for the structure as thus far described, the invention residing more especially in the propelling and supporting runners of special formation, in means for transmitting power thereto, a special arrangement of transmission gear housing or casing, and certain detail features of construction now to be more particularly pointed out.

The said supporting and propelling runners are by preference located in rear of the front steering runners 3 under the main load carrying section of the sleigh, but obviously this relation of runners may be reversed if desired without in the least departing from the spirit of the invention or its method of operation. They are of helical and cage-like form, arranged in oppositely disposed pairs 9, 9 and 10, 10, each pair being upon opposite sides of the longitudinal center of the sleigh. Moreover, these said supporting and propelling runners are connected with the main frame 1 by means of depending hangers 11 encircling at their lower ends a transmission gear housing 12 near each end thereof as shown by Figs. 1, 2, and 3.

Extending through each enlarged T end 12' of said gear housing 12, and at right angles thereto, are parallel driving shafts 13 and 14. These shafts extend equal distances upon each side of the gear housing according to the length of runners 9, 9 and 10, 10, employed. In the present illustrations said helical runners are shown of equal length and four in number, although this may be varied indefinitely according to requirements in special cases. The four helical runners shown are counterparts one of the other, except for the fact that the pitch of the oppositely arranged pairs is reversed, they being oppositely driven as will later appear, and for this reason a description of a single cage-like helical runner will suffice for all.

Each of these important elements of the present invention therefore, consists of a cylindrical cage-like screw or helix, capable of being rotated in either direction, and formed of a plurality of V-shaped steel bars 15 having their concave sides toward the center of the structure, and their convex sides outwardly inclined so as to produce a V-shaped track in the snow when used. They are also of a pitch best suited to the local snow and load conditions, and are secured in place by means of radial arms or spiders 16 which are themselves securely mounted in suitable hubs 17 keyed to their respective driving shafts 13 and 14. These radial arms 16, moreover, by preference each terminate at their outer ends in an enlarged head 18, of substantially cubical form, having sides 19 arranged and adapted to neatly engage the convex inner surface or angular grooves in the ribs or bars 15, and by means of suitable bolts 20 the said heads and V-bars are rigidly secured together, as clearly shown by Fig. 4.

In the present form of V-rib or angle bar 15, filler or reinforcing strips 21 are employed, any suitable material being used for this purpose, but preference being given to hard wood strips of a cross sectional area corresponding with the convex shape of ribs 15, and steam bent to conform with their helical contour, that form shown by Fig. 6 being triangular.

As to the included angle of these V grooves that is, of course, constant in any one sleigh, but obviously this may be varied indefinitely on sleighs of different capacities and in sleighs intended for use under different climatic conditions, thereby securing an effective footing in the snow for a wide range of road and load conditions.

In practice, filler strips 21 are held in place primarily by coöperation of the angular faces or sides 19 of the head sections 18 formed upon the outer ends of radial arm or spokes 16 as aforesaid. The angular sides 19 of head sections 18, which are not in engagement with the V grooves of ribs 15, constitute retaining surfaces for engagement with the correspondingly beveled ends of said filler strips 21, thus dovetailed in place between corresponding surfaces 19 upon adjacent heads 18, within the V grooves of their respective rib sections, as the helical runners are originally assembled.

In constructing the helical cage-like supporting and propelling runners of the present invention it is quite obvious that the number, length and diameter, as also the pitch of the runner elements may be greatly varied according to service requirements, but in the form of construction shown by the drawings, as an exemplification of this invention, six helical V ribs or angle bars 15 are employed. And it will be particularly noted that opposite ends of these individual ribs 15 are bent inwardly toward the center of the cage-like structure, upon the arc of a smaller helix preserving the same pitch as nearly as possible so as to provide for running either way, and guard against a digging tendency which the helical runners would otherwise have.

The power transmission for operating these helical load supporting and propelling runners 9 and 10, comprises a train of gearing of any well known construction, and any desirable form of a prime mover such as diagrammatically represented at 2 Fig. 1. A power shaft 23 extends rearwardly from the said engine, and is provided with a bevel gear 24 (shown in dotted lines) meshing with a similar larger gear 25, adapted to coöperate with an ordinary differential 26, and with laterally extending driving shafts 27, 27. Upon the outer ends of the latter shafts are secured bevel gears 28, 28, which in turn mesh with similar gears 29, 29, securely keyed to the longitudinal and parallel power transmitting shafts 13 and 14 carrying the helical runners 9 and 10, as hereinbefore set forth.

Within the gear casing 12 and its oppositely disposed T ends 12' suitable bearings are provided for all moving parts, and the foregoing being a description of the invention in one form of embodiment its operation will now be briefly set forth as follows:

Power applied through main shaft 23, and suitable gearing such as shown by dotted lines within gear casing 12 and 12', to power shafts 13 and 14, causes their respective cage-like helical runners 9 and 10, arranged in tandem pairs, to rotate in reverse directions, their V-shaped exterior surfaces in the meantime cutting corresponding grooves in the surface of the snow, thereby advancing the sleigh of which they are a part, or backing same as the case may be, upon the principle of a screw cutting its way in soft wood. It will be observed that the present cage-like driving and supporting runners insure lightness and strength, and at the same time a structure which will not become clogged or congested in damp sticky snow.

And because of the said peculiar V bearings in the snow, coupled with the principle of applying both the weight of the load and the propelling force through the same identical supporting surfaces, a most effective tractive footing is obtained for the individual ribs or bars 15 in grooves which they themselves have packed; cutting or tearing back of said grooves at an angle to the rotary slipping action of said helical ribs 15 is prevented and there is constantly produced a reacting, or climbing tendency which uplifts the entire structure as the sleigh is driven in either direction.

Having thus described one embodiment of my invention, it will be noted that various structural changes may be made and substituted for parts herein shown and described without in the least departing from the spirit of my invention, which will now be set forth in the following claims:

1. A helical propelling member for motor driven sleighs comprising spaced apart parallel V-shaped angle bars, having their intermediate portions concentric with a central axis and having their outer ends terminating eccentrically thereto, and supporting spokes extending into the angle of the V-shaped bars, for positioning the said propelling member in open cage-like formation.

2. A helical propelling member for motor driven sleighs comprising spaced apart parallel V-shaped angle bars, having their intermediate portions concentric with a central axis and having their outer ends terminating eccentrically thereto, and spaced spider supports having heads adapted to fit within the angle of the V-shaped bars for positioning the said propelling member in open cage-like formation.

In testimony whereof I affix my signature, in presence of two subscribing witnesses.

JOHN S. CHISHOLM.

Witnesses:
JAMES G. LARMER,
J. F. FITZSIMONS.

Copies of this patent may be obtained for five cents each, by addressing the "Commissioner of Patents, Washington, D. C."